United States Patent [19]

Asakura et al.

[11] Patent Number: 4,636,810

[45] Date of Patent: Jan. 13, 1987

[54] THERMAL PRINTER

[75] Inventors: Osamu Asakura, Tokyo; Mineo Nozaki, Kawasaki; Masasumi Nagashima, Kanagawa; Yoshio Uchikata, Kawasaki, all of Japan

[73] Assignee: Canon Kabushiki Kaisha, Tokyo, Japan

[21] Appl. No.: 487,086

[22] Filed: Apr. 21, 1983

[30] Foreign Application Priority Data

Apr. 28, 1982 [JP] Japan .................................. 57-72366

Apr. 28, 1982 [JP] Japan .................................. 57-72371

[51] Int. Cl.[4] .............................................. G01D 15/10

[52] U.S. Cl. ................................. 346/76 PH; 460/120

[58] Field of Search .............. 346/46, 76 PH; 400/120

[56] References Cited

U.S. PATENT DOCUMENTS 4,141,018 2/1979 Mizuguchi et al. .............. 346/76 R 4,364,063 12/1982 Anno et al. ..................... 346/76 PH 4,377,972 3/1983 O'Neil ........................ 346/76 PH X 4,415,907 11/1983 Suemori ......................... 346/76 PH 4,464,669 8/1984 Sekiya et al. .................... 346/76 PH

*Primary Examiner*—E. A. Goldberg

*Assistant Examiner*—Gerald E. Preston

*Attorney, Agent, or Firm*—Fitzpatrick, Cella, Harper & Scinto

[57] ABSTRACT

A thermal printer is capable of maintaining the heating elements thereof at a constant temperature to achieve uniform print density and to avoid abnormal heating of the heating elements. For this purpose each heating element receives a stronger driving pulse at the first printing operation in a scan line and receives a weaker driving pulse at the subsequent printing operation.

10 Claims, 15 Drawing Figures

THERMAL PRINTER

BACKGROUND OF THE INVENTION

1. Field of the Invention

The present invention relates to a thermal printer in which a thermal head provided with heating elements is electrically driven to generate heat from said heating elements, thereby printing a desired pattern on a heat-sensitive recording sheet or transferring heat-fusible ink of an ink ribbon in a desired pattern onto a recording sheet by means of said heat.

2. Description of the Prior Art

For use in the thermal printers there have conventionally been known a few types of thermal heads, such as a line printing head having a horizontal array of heating elements of a number equal to the number of dots over the entire printing width, or a serial printing head having a vertical array or a matrix of heating elements and moved in the direction of printing width.

FIG. 1 shows an example of such thermal head having a vertical array of seven heating elements prepared by thin film technology.

As shown in FIG. 1, a ceramic substrate 101 is provided thereon with a heat insulating layer 102 composed for example of a glass material, on which are formed resistors 103, for example of TaN. Except for heating element areas 103*a*, said resistors 103 are covered with conductor layers 104 composed for example of aluminum or gold and constituting lead wires thereby exhibiting a high resistance only in said heating element areas 103*a*. Thus a current supply for example between a terminal 105-1 and a common terminal C generates heat only in the uppermost heating element 103-1. A radiating plate 106 is provided for preventing heat accumulation in the ceramic substrate.

In the thermal printer, the thermal head as shown in FIG. 1 is pressed against a heat-sensitive recording sheet or against a recording sheet across a thermal transfer ink ribbon, and the desired heating elements of the thermal head are energized to generate heat when said thermal head reaches a desired position by the displacement of said head or said recording sheet, thereby generating color in said heat-sensitive recording sheet or transferring the heat-fusible ink of said ink ribbon in a desired form onto the recording sheet.

As will be apparent from the above-described structure, the thermal head has a certain heat capacity. Since the printing is achieved by heat generation from the heating elements, it is difficult to maintain the heating elements of the thermal head at a constant temperature from the start to the end of printing operation. Moreover, as the printing operation progresses the thermal head accumulates heat, thus causing higher printing density and resulting in uneven printing.

Also in the case of printing a line for example, the same heating elements are continuously energized over a long period and can become abnormally heated, so that the service life of the thermal head becomes shortened because of the fatigue caused by high temperature.

SUMMARY OF THE INVENTION

An object of the present invention is to provide a thermal printer capable of maintaining the heating elements of the thermal head at a constant temperature, thereby preventing abnormal heating and uneven print density and extending the service life of the thermal head.

Another object of the present invention is to provide a thermal printer in which the energizing time to a given heating element of the thermal head is shortened, and is made shorter in case the same printing pattern is repeated a determined number of times.

Still another object of the present invention is to provide a thermal printer in which the first energization of a heating element in a printing scan is achieved by a longer printing pulse and the subsequent energization is achieved by one or plural shorter printing pulses.

Still another object of the present invention is to provide a thermal printer comprising a thermal head comprising plural heating elements; pulse supply means for supplying said thermal head with printing pulses; and control means for controlling said pulse supply means in such a manner as to supply first printing pulses to the heating elements of said thermal head at a first print operation after the start of a print scan, and to supply, at a second print operation, second printing pulses, which generate less heat than that generated by said first printing pulses, to the heating elements other than those energized in said first print operation.

DETAILED DESCRIPTION OF THE PREFERRED EMBODIMENTS

Now the present invention will be clarified in detail by an embodiment in which the present invention is applied to a thermal transfer printer utilizing serial printing method.

Figure 2:
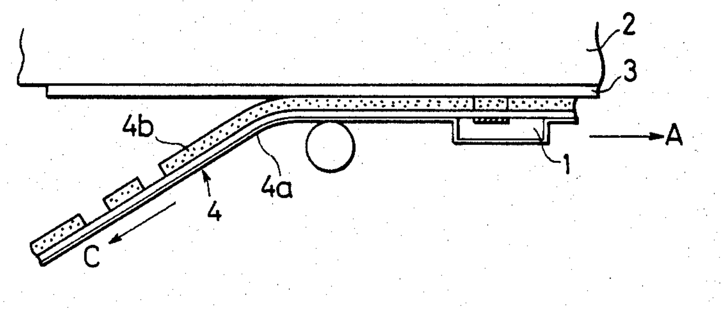
FIG. 2 is a schematic view showing the printing process employed in an embodiment used for explaining the present invention.

In a thermal transfer printer, as shown in FIG. 2, a thermal head 1 and a platen 2 are positioned across a printing sheet 3, and a thermal transfer ink ribbon 4 is provided between said printing sheet 3 and the thermal head 1. Said thermal head 1 is driven in a direction A and is given printing signals at desired printing positions to energize desired heating elements of the thermal head 1, thereby transferring the ink 4*b* on said ink ribbon 4 onto the printing sheet 3 in a desired pattern.

Figure 3:
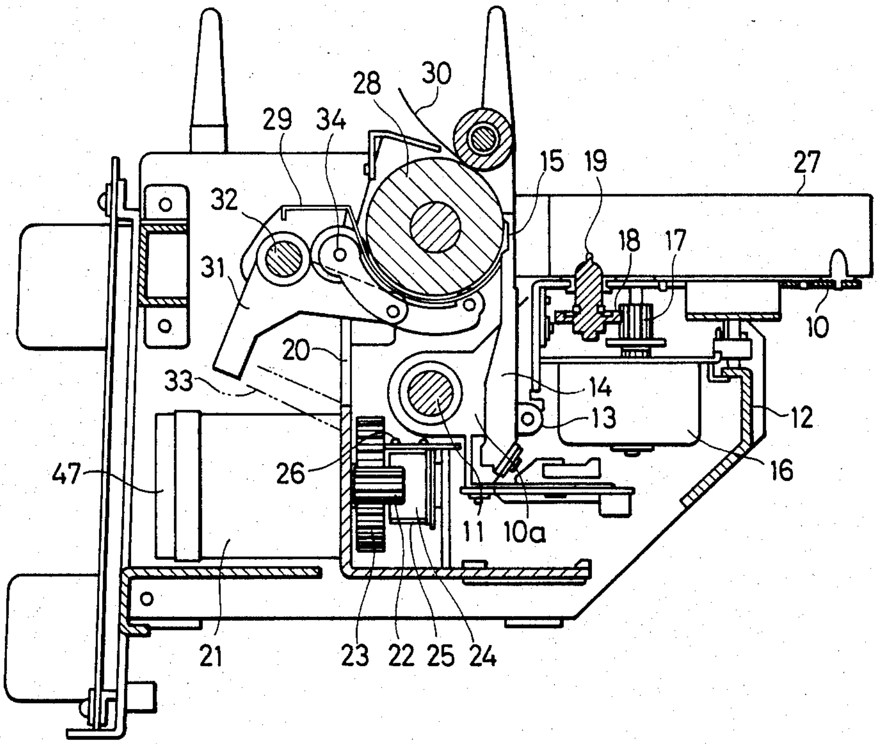
FIGS. 3 and 4 are lateral cross-sectional views of an embodiment of the present invention.

FIG. 3 is a lateral cross-sectional view of the thermal transfer printer embodying the present invention, wherein a carriage 10 is slidably fitted, at an end thereof, on a horizontal guide shaft 11 through an arm 10*a*, and is slidably guided, at the lower face thereof, by a guide rail 12. An arm 14 is rotatably supported, at the lower end thereof, by a shaft 13 provided in a part of the arm 10*a* of the carriage 10. The upper end of said arm 14 supports a thermal head 15, to be explained later, on a side facing the platen.

On the lower face of the carriage 10 there is mounted for example a stepping motor 16, which drives, through a gear 17 mounted on the shaft of said motor and another gear 18 engaging with said gear 17, a shaft 19 to advance the ink ribbon. Said stepping motor 16 naturally moves with the carriage 10.

On the printer there is fixed a motor 21 for driving the carriage 10 by means of a bracket 20, and a gear 22 fixed on the shaft of said motor meshes with a gear 23 fixed with a pulley 24, which supports a driving belt 25 in cooperation with another, unrepresented pulley provided on the printer. Said driving belt 25 is formed as an endless belt, a part of which is fixed to the arm 10*a* of the carriage 10 through a connector 26, whereby the carriage 10 is displaced by the movement of the belt 25 caused by the motor 21.

On said carriage 10 there is detachably mounted an ink ribbon cassette 27, which will be later explained in more detail.

In facing relationship to the carriage 10 there are horizontally provided a platen 28 and a surrounding guide member 29, between which a printing sheet 30 is inserted. Said guide member 29 is mounted on an arm 31, which is rotatably supported by a shaft 32 and is anticlockwise biased by a spring 33 provided between an end of said arm and said bracket 20. On said arm 31 mounted is a pinch roller 34 for guiding the printing sheet 30 to a position opposed to the thermal head 15.

Figure 4:
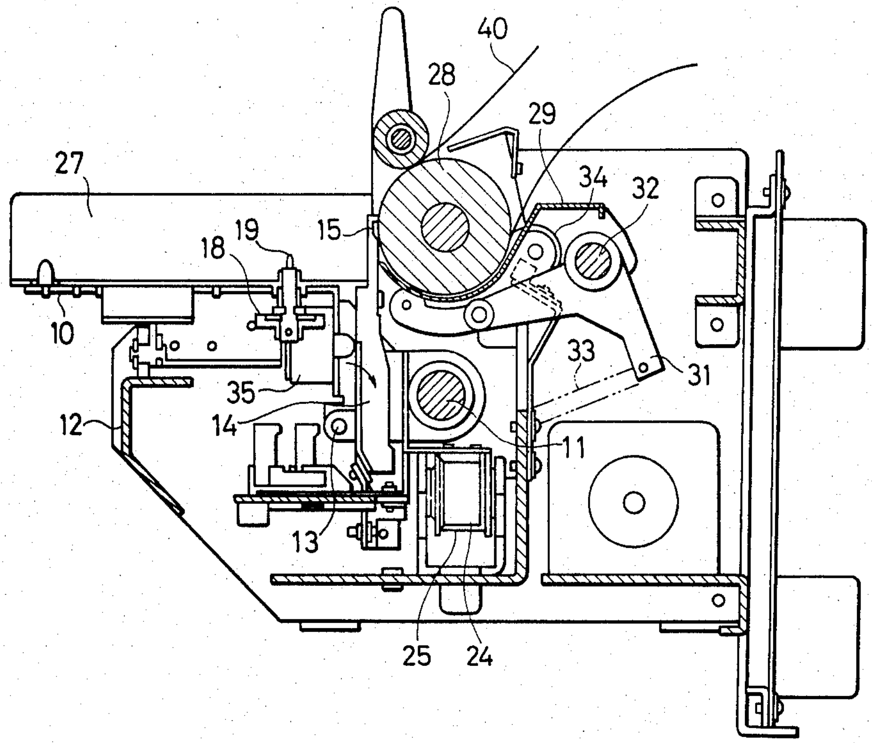

A solenoid 35 mounted in the vicinity of said arm 14 as shown in FIG. 4 is energized at the printing operation to advance the plunger, thereby rotating said arm 14 clockwise and pressing the thermal head 15 against the platen 28.

Figure 5:
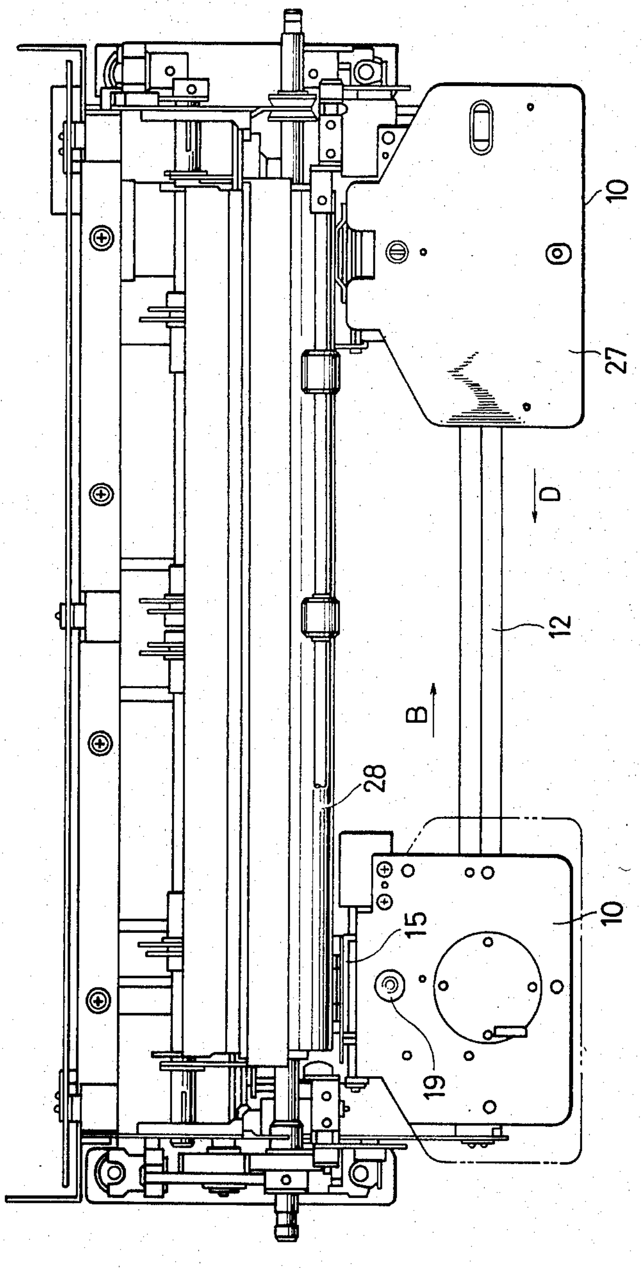
FIG. 5 is a plan view of an embodiment of the present invention.

FIG. 5 is a plan view of the printer, in which the carriage 10 is represented twice, at the left end position and at the right end position. Said carriage 10 at the left end position is shown with the ink ribbon cassette 27 while that at the right end position is shown without said cassette.

During the printing operation, the carriage 10 moves in a direction B parallel to the platen 28 along the guide shaft 11 and the guide rail 12, while supporting the thermal head 15, ink ribbon cassette 27 and driving members therefor and pressing said thermal head 15 against the platen 28.

Figure 6:
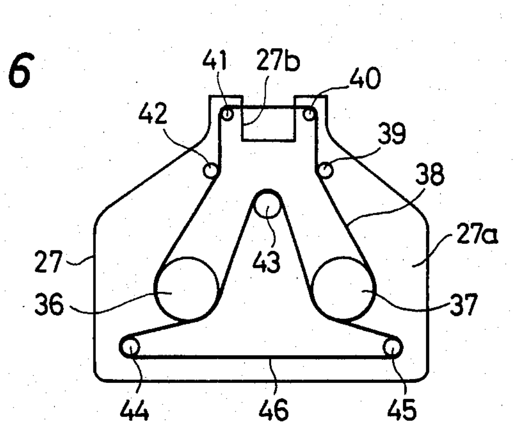
FIG. 6 is a schematic view showing the structure of an ink ribbon cassette for use in a thermal transfer printer embodying the present invention.

FIG. 6 is a cross-sectional view of the ink ribbon cassette, wherein a cassette case 27*a* supports a take-up reel 36 and a feed reel 37 for an ink ribbon 38, which is supplied from said reel 37 and guided to said take-up reel 36 through guide rollers 39–42. At the front end of said cassette case 27*a* there is formed an aperture 27*b*. The ink ribbon 38 is supported at the front end of said aperture 27*b*, and the thermal head 15 is inserted into said aperture when the ink ribbon cassette 27 is mounted on the carriage 10. The cassette case 27*a* is further provided with a driving roller 43 in the vicinity of the reels 36, 37 and guide rollers 44, 45 at both ends for supporting a driving belt 46, which is maintained in elastic contact with said reels 36, 37. The driving roller 43 is rotated by the shaft 19 driven by the aforementioned stepping motor 16, whereby the ink ribbon 38 is advanced with the movement of the driving belt 44.

Figure 7A:
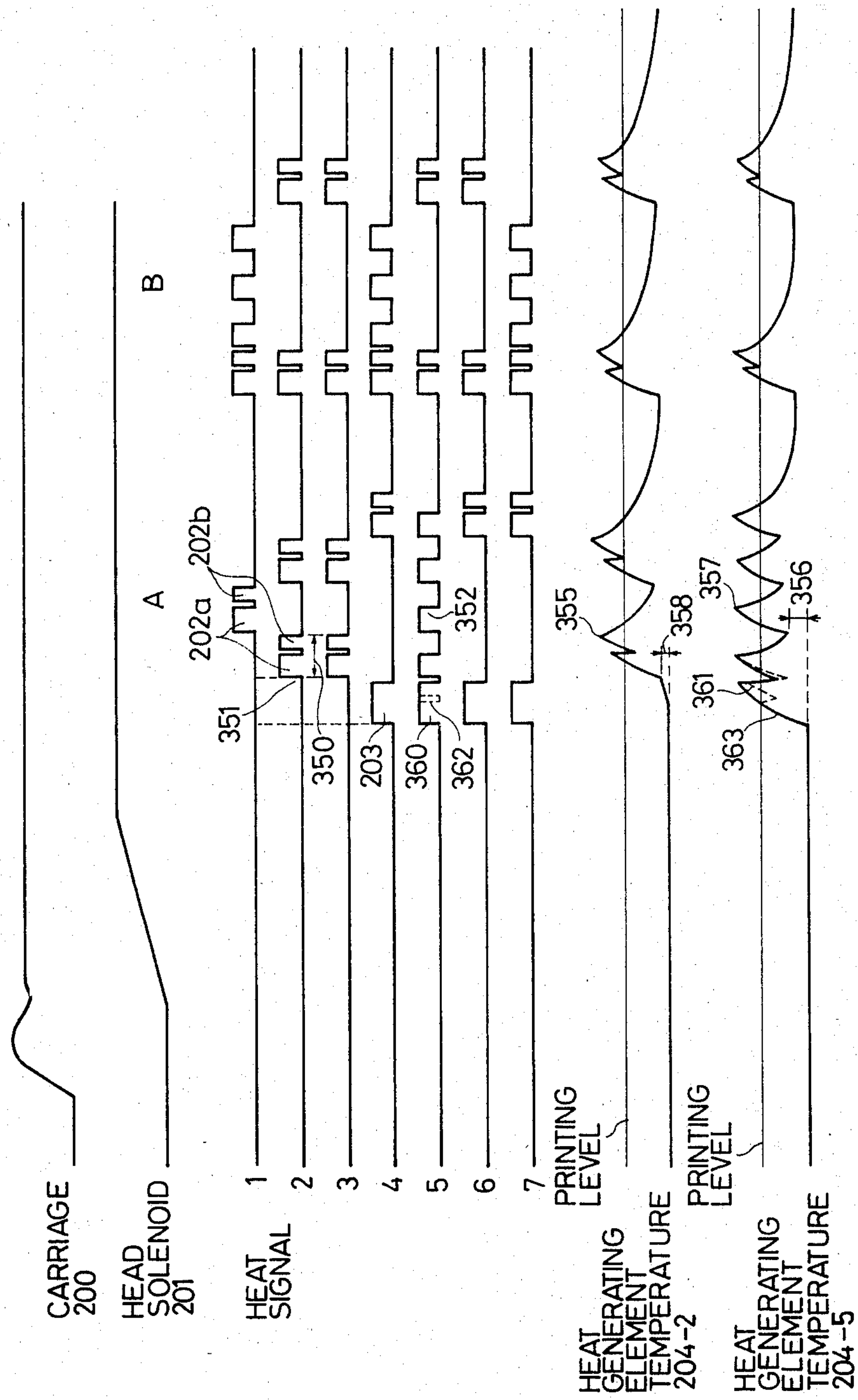
FIGS. 7A and 7B are timing charts showing the function of the present invention.

FIG. 7A is a timing chart showing the function of the above-described thermal transfer printer in case of printing characters "A" and "B".

At first the carriage driving motor 21 is activated to start the carriage displacement as represented by a curve 200. At the start of carriage running a preparatory run over a certain distance is desirable since stable displacement is not immediately reached due to acceleration of the carriage driving motor 21 and stretching of the driving belt 25. The printing of the first character "A" is started when the thermal head 15 reaches the stable running state. As will be understood from the chart, the printing of the character "A" is achieved by energizing the 4th to 7th heating elements from the top in the thermal head 15 at the first column, then the 2nd, 3rd and 5th elements in the second column, the 1st and 3rd elements in the third column, the 2nd, 3rd and 5th elements in the fourth column and the 4th to 7th elements in the fifth column.

As shown in the chart, there are employed three energizing pulses 202*a*, 202*b*, 203 of different durations. As an example, consider the second heating element of the thermal head 15 at a print timing 350. Being not energized at an immediately preceding print timing 351, said heating element is in a cooled state as represented by a curve 204-2 and is not sufficiently heated by the printing pulse 202*a* alone. Consequently a heating element not energized at the immediately preceding print timing is given a correcting pulse 202*b* succeeding to said printing pulse 202*a* and within the same dot print timing 350, whereby the temperature can be raised to the approximately same level as in other cases as represented by a curve 355.

On the other hand, in case the element is energized at the immediately preceding print timing 351, for example the fifth heating element at a print timing 352, the printing pulse 202*a* alone provides the desired temperature as represented by 357 in a curve 204-5 because of the heat accumulation 356 in the heating element.

Now consider in more detail the printing operation at a dot print timing 350. At the immediately preceding print timing 351, the 4th to 7th heating elements of the thermal head 15 are energized, and the resulting heat is transmitted by thermal conduction in the thermal head 15 to the 2nd heating element, thus creating a heat accumulation represented by 358. On the other hand, at the first print timing 360 after the start of print scan, the pulses 202*a* and 202*b* are unable to provide a sufficient temperature as represented by a broken line 361 because of the absence of such heat conduction from other heating elements. The presence of an interval 362 required for data processing between the pulses not only becomes a loss in the print timing 351 but also results in a reduced heat generating efficiency presumably caused by temporary heat radiation during the heating as represented by 363, thus leading to a more enhanced heat deficiency.

In the present invention, the aforementioned deficiency of heat generation from the heating elements of the thermal head 15 is resolved by the use of a single pulse 203, as represented by a solid line 360, for the dot to be printed at the first print timing after the start of print scan, wherein said pulse 203 is selected longer than other pulses 202*a*, 202*b* so as to generate sufficient heat in the heating element.

Figure 7B:
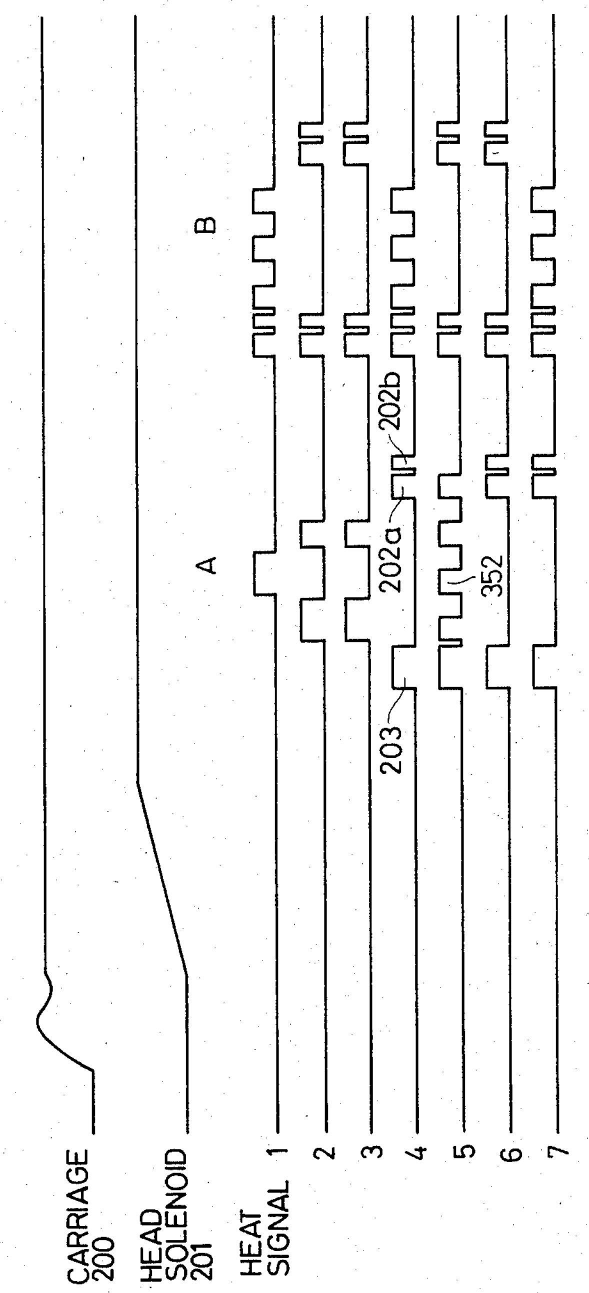

FIG. 7B shows a modification over the method shown in FIG. 7A, wherein each of the first to seventh heating elements receives said pulse 203 at the first print timing after the start of print scan.

In the embodiment shown in FIG. 7B, the carriage 10 is returned to the original position at a high speed after the completion of printing of a line in the above-mentioned manner, and the print scan for the suceeding line is conducted in the same manner, in which the first printing operation is conducted with said pulse 203.

Figure 1:
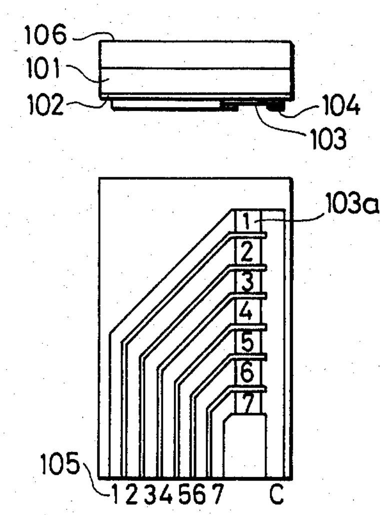
FIG. 1 is a schematic view showing the structure of a thermal printing head.
Figure 8:
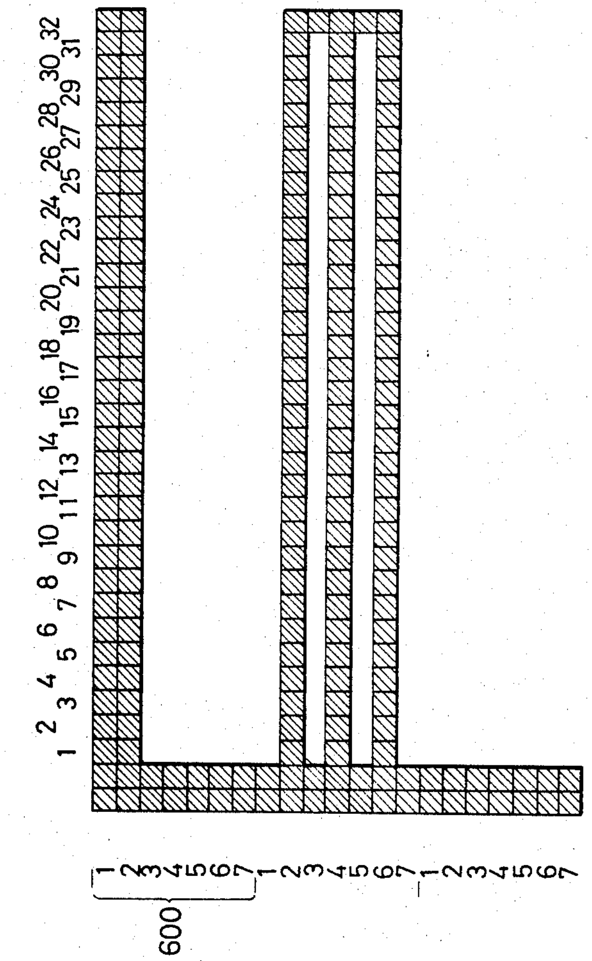
FIG. 8 is a view showing a print example of form lines and graphs.
Figure 9:
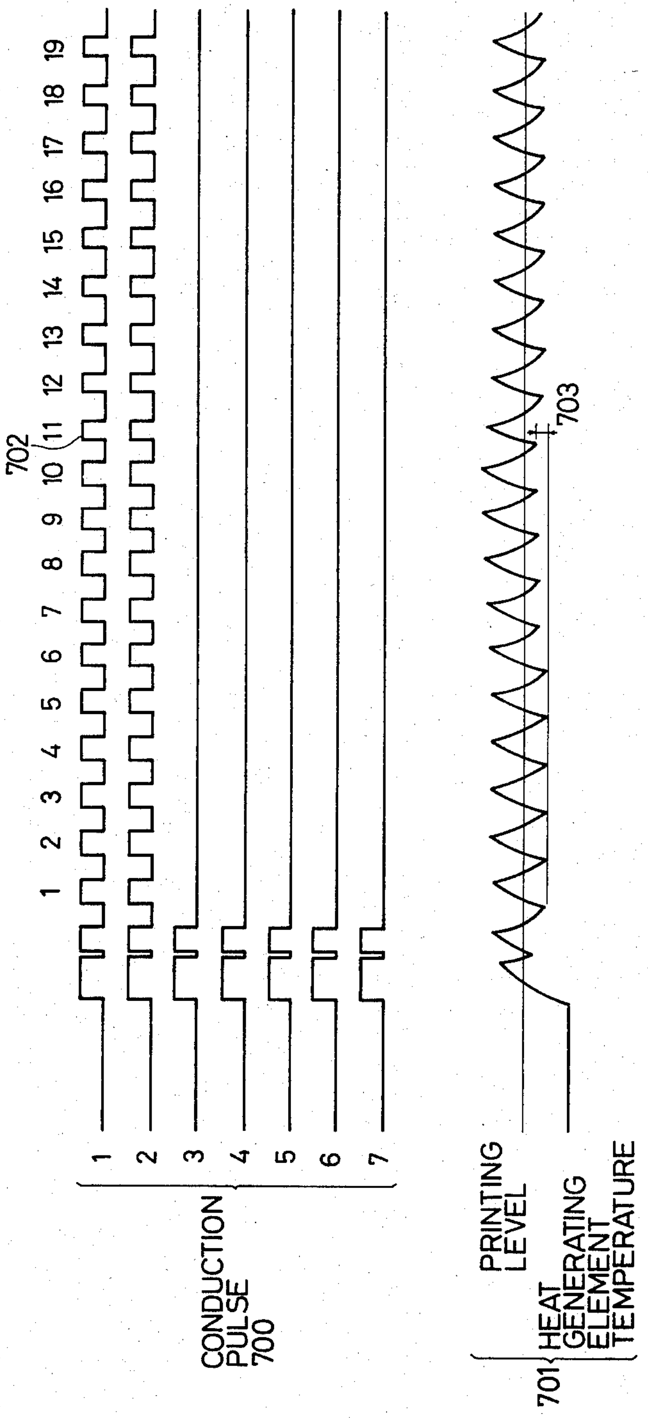
FIG. 9 is a timing chart corresponding to the print operations shown in FIG. 8.

FIG. 8 shows an example of printing of form lines and bar graphs, and FIG. 9 shows a corresponding timing chart. In such printing the same heating elements of the thermal head may be continuously energized as same print pattern is repeated over a long period. Stated inversely, continuous energization of a same heating element of the thermal head takes places almost only when a same print pattern continues as explained above. In FIG. 9, pulses 700 correspond to a form line 600 shown in FIG. 8, and a curve 701 represents the heating state of the 2nd heating element of the thermal head. Because of the repeated energizations of the 2nd heating element used for printing said form line, heat is accumulated in the ceramic substrate 101 and the radiating plate 106 shown in FIG. 1, even to a level 703 after ten pulses despite the correction in the pulse duration. In the present invention, therefore, in the case that a same print pattern is repeated in excess of 10 times, as represented by the 1st and 2nd heating elements shown in FIG. 9, the pulses are switched over to even shorter pulses 702 for avoiding overheating of such heating elements. Such overheating of the heating elements not only increases the print density but also results in insufficient cooling of the heating element between energizations, thus deteriorating the resolving power of the obtained print and reducing the service life of the heating elements due to thermal fatigue.

In the present embodiment the pulses are made shorter in the case that same print pattern is repeated ten times, but the number of such repetition can be suitably selected in consideration of the print speed and the thermal head structure.

Figure 10:
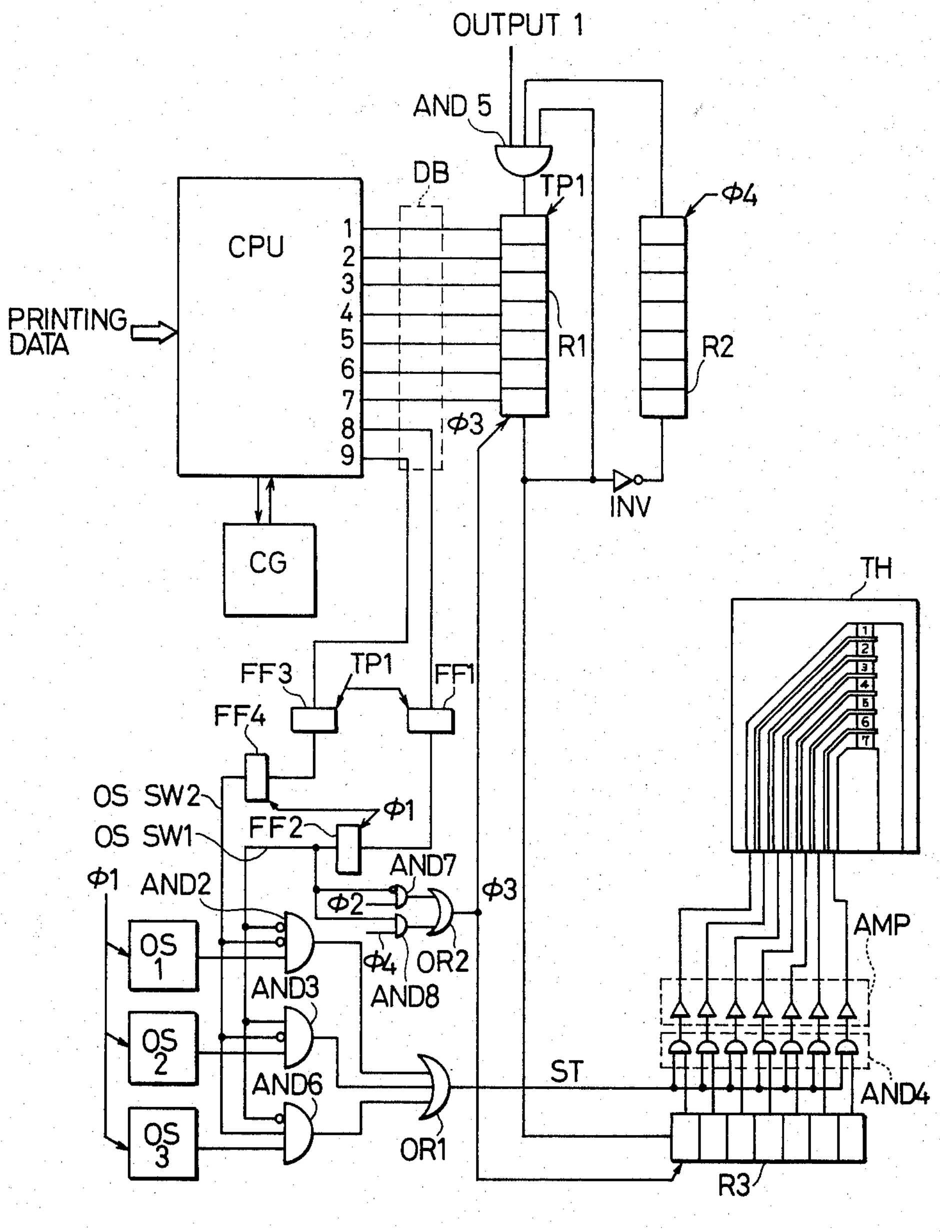
FIG. 10 is a block diagram of a control circuit for generating pulses shown in FIGS. 7A, 7B and 9.
Figure 11A:
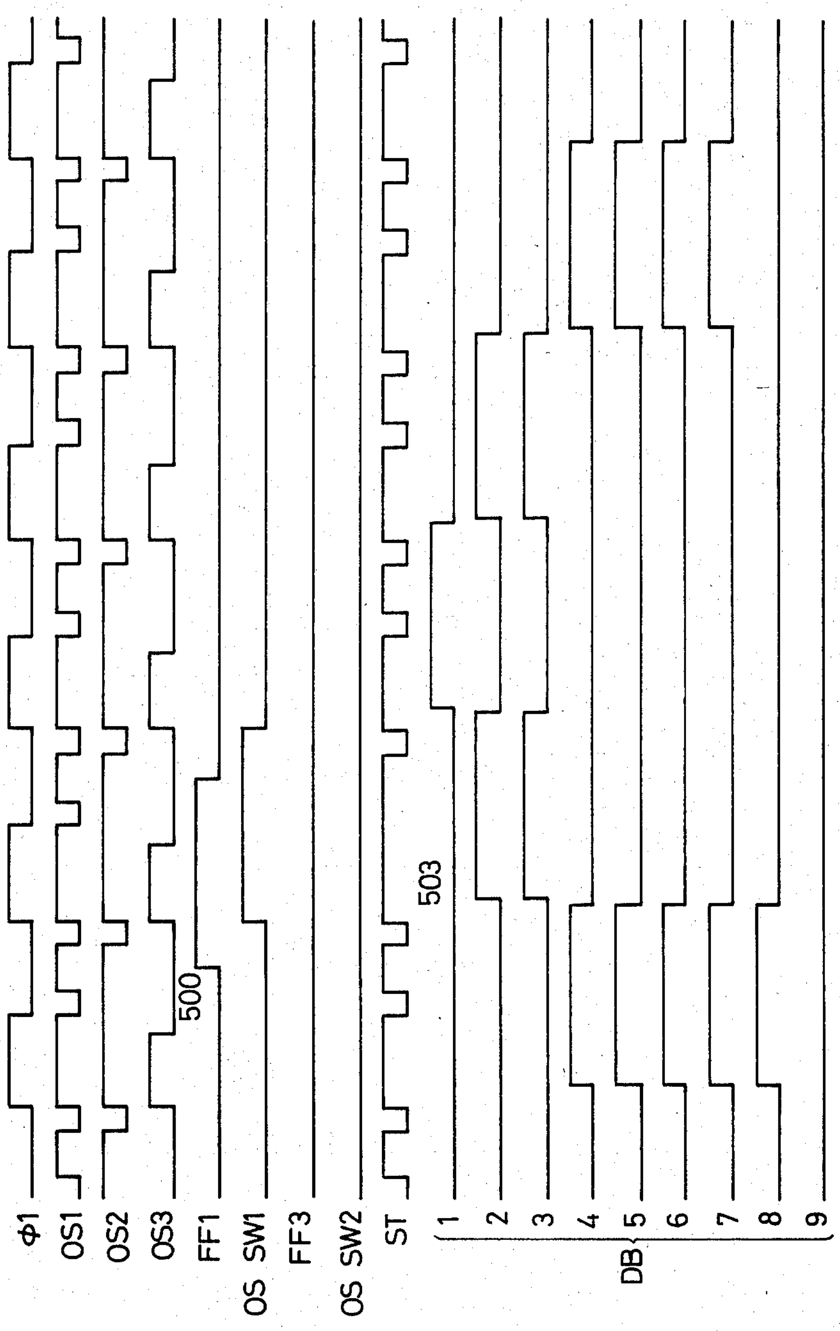
FIGS. 11A, 11B, 11C and 12 are timing charts showing the function of the control circuit show in FIG. 10.
Figure 11B:
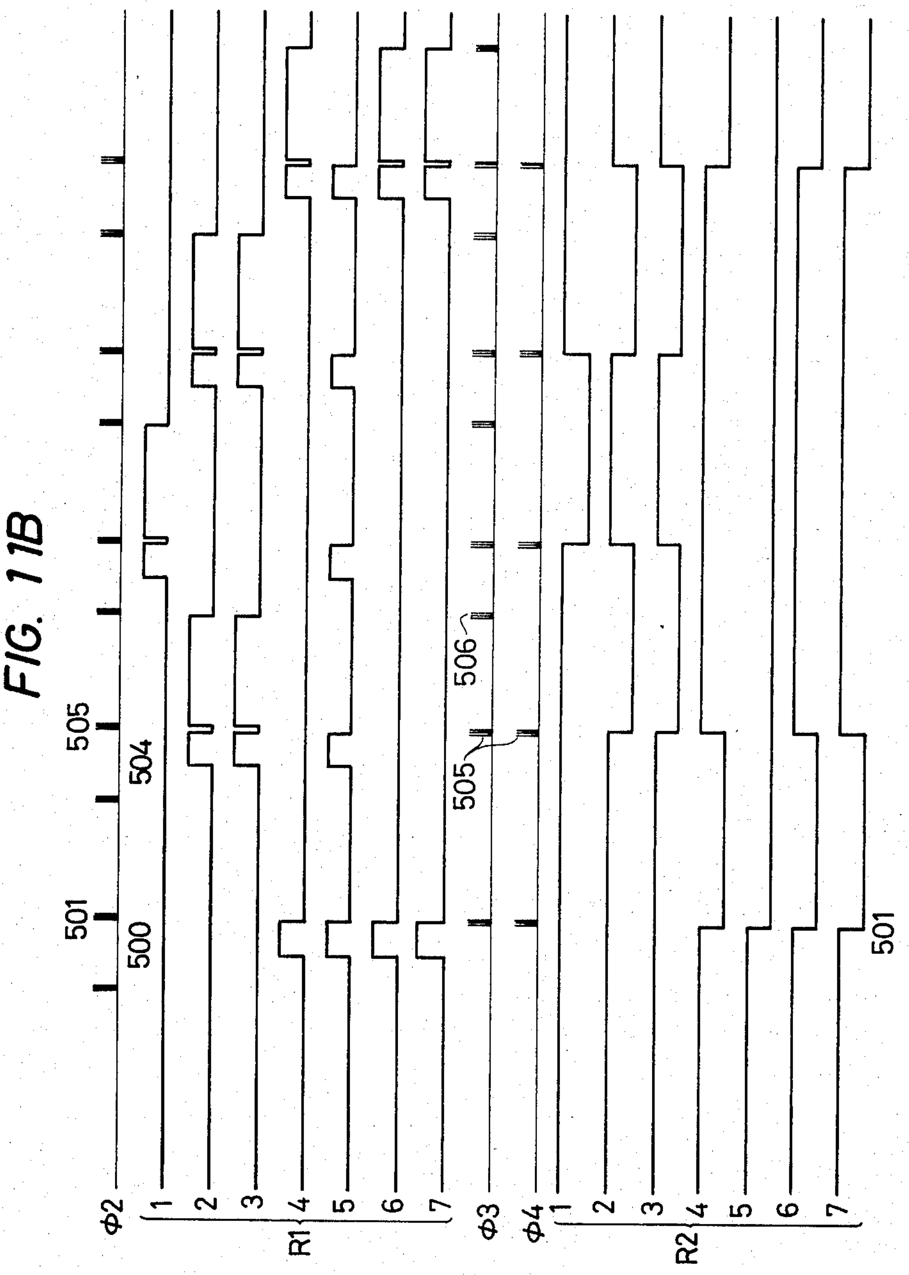

FIG. 10 is a block diagram of a control circuit for generating pulses as shown in FIGS. 7A, 7B and 9, and FIGS. 11A, 11B and 11C are timing charts showing the function of said control circuit. A central processing unit CPU for print data processing generates, in response to print data entered from unrepresented input means such as a keyboard, energization signals for the 1st to 7th heating elements of the thermal head 15 (or TH in FIG. 10) through terminals 1–7. A terminal 8 releases a signal "1" for the first signals after the start of print scan, and a terminal 9 releases a signal "1" when a same print pattern is repeated in excess of ten times. Said central processing unit CPU discriminates the first signal after the start of the print scan and the number of repetitions of a same print pattern. There are also provided a charactor generator CG for generating a character font corresponding to print data; a shift register R1 for storing the energization signals supplied from the terminals 1–7 of the central processing unit CPU to the 1st to 7th heating elements of the thermal head 15 in synchronization with a timing pulse TP1 shown in FIG. 11C and releasing said signals in synchronization with a timing signal $\phi$3; a correction register R2 for storing the energization signals released from the shift register R1 and inverted by an inverter INV, namely for storing the preceding energization signals, in synchronization with a timing signal $\phi$4; an energization register R3 for storing the energization signals released from the shift register R1; an AND gate AND5 receiving a signal "1" constantly at a first input terminal, the energization signals from the shift register R1 at a second input terminal and the inverted energization signals from the correction register R2 at a third input terminal; a flip-flop FF1 to be set and reset according to the signal state of the terminal 8 of CPU in synchronization with the timing signal TP1; a flip-flop FF2 to be set and reset according to the state of the output signal from the flip-flop FF1 in synchronization with the timing signal $\phi$1; a flip-flop FF3 to be set and reset according to the signal state of the terminal 9 of CPU in synchronization with the timing signal TP1; a flip-flop FF4 to be set and reset according to the state of the output signal from the flip-flop FF3 in synchronization with the timing signal $\phi$1; pulse oscillators OS1, OS2, OS3 for generating energizations pulses as shown in FIG. 11A; an AND gate AND2 for transmitting the pulse from the oscillator OS1 in case the flip-flop FF2 releases a "0"-level output signal OSSW1 and the flip-flop FF4 releases a "1"-level output signal OSSW2; an AND gate AND3 for transmitting the energization pulse from the oscillator OS2 in case the flip-flop FF2 releases a "1"-level output signal OSSW1 and the flip-flop FF4 releases a "0"-level output signal OSSW2; an AND gate AND6 for transmitting the energization pulse from the oscillator OS3 in case the flip-flop FF2 releases a "0"-level output signal OSSW1 and the flip-flop FF4 releases a "1"-level output signal OSSW2; an AND gate AND7 for releasing a timing signal $\phi$2 as shown in FIG. 11B in case the flip-flop FF2 releases a "0"-level output signal OSSW1; an AND gate AND8 for releasing a timing signal $\phi$4 as shown in FIG. 11B in case the flip-flop FF2 releases a "1"-level output signal OSSWl; an OR gate OR1 for transmitting the signals from the AND gates AND2, AND3, AND6 as an energization strobe signal ST; an OR gate OR2 for transmitting the signals from the AND gates AND7, AND8 as a timing signal $\phi$3; an AND gate group AND4 for transmitting the energization strobe signal from the OR gate OR1 in case the register R3 releases a "1"-level energization signal; amplifiers AMP for amplifying the output signals from the AND gate group AND4; and a thermal head TH having a vertical arry of seven heating elements as explained in the foregoing.

Now there will be given an explanation of the function of the above-described control circuit in case of printing a character "A" with a 5×7 dot matrix.

Upon entry of print data from unrepresented input means such as a keyboard, the central processing unit CPU extracts a character font corresponding to the character code of the print data from the character generator CG and supplies the energization signals corresponding to the dots in the first column through a data bus DB to the shift register R1 having parallel input ports. As already explained in the foregoing, the CPU releases 9-bit parallel energization signals from the terminals 1–9, of which the terminals 1–7 release the energization signals to the 1st to 7th heating elements of the thermal head, while the terminal 8 releases a signal "1" only for the first signal after the start of print scan and the terminal 9 releases a signal "1" when a same print signal is repeated in excess of ten times. The signal from said terminal 8 is supplied to the flip-flop FF1 while that from said terminal 9 is supplied to the flip-flop FF3. Consequently the energization signals from the CPU are supplied, in synchronization with the timing signal TP1, through the data bus DB to the shift register R1 and to the flip-flops FF1, FF3, at a timing 500 shown in FIG. 11B.

The energization signals entered in the shift register R1 are supplied to the energization register R3 in synchronization with the timing signal $\phi 3$, and are also stored, after inversion by the inverter INV, in the correction register R2, which is controlled in synchronization with the timing signal $\phi 4$, at a timing 501 shown in FIG. 11B. The energization signals supplied to the energization register R3 are supplied, in synchronization with the energization strobe signal ST in the AND gate AND4, to the thermal head for effecting the print operation. Said energization strobe signal ST is generated by the pulse oscillators OS1, OS2, OS3 in synchronization with the timing signal $\phi 1$. The pulse oscillator generates a pulse pattern corresponding to the pulses 202*a* and 202*b* shown in FIG. 7A, while the pulse oscillator OS2 generates a long single pulse 203 shown in FIG. 7A at the first print operation after the start of print scan, and the pulse oscillator OS3 generates repetitive pulses 702 shown in FIG. 9. The pulses from said pulse oscillators OS1, OS2, OS3 are selected by the AND gates AND2, AND3, AND6 and the OR gate OR1 in response to the output signals OSSW1, OSSW2 of the flip-flops FF1, FF2, FF3, FF4 which are controlled by the energization signals from the terminals 8, 9 of the CPU. After the start of print scan the terminal 8 of CPU releases a "1"-level signal to deliver a "1"-level output signal from the flip-flop FF2, thereby opening the AND gate AND3 and transmitting the pulse 207 from the oscillator OS2 as the strobe signal ST to the gate AND4, whereby long single pulses are supplied for the dots in the first column, at a timing 502 shown in FIG. 11C.

Figure 11C:
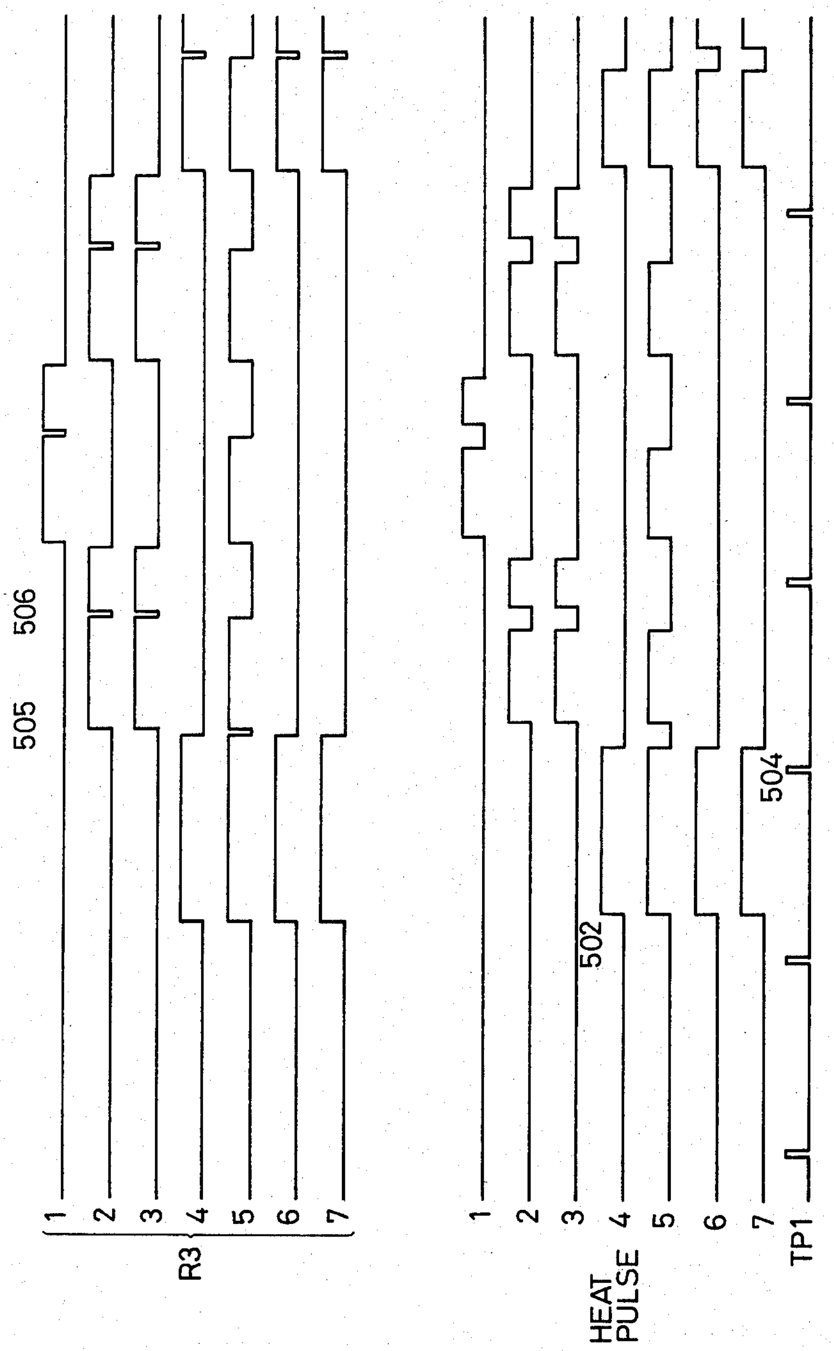

After a while from the start of printing operation, the energization signals corresponding to the dots in the second column are supplied from the terminals 1–7 of CPU to the data bus DB at a timing 503 shown in FIG. 11A and are stored in the shift register R1 in synchronization with the timing signal TP1, at a timing 504 shown in FIG. 11C. The signal released from the terminal 8 of CPU remains in a state "0" from said energization signal until the completion of a print scan, whereby the strobe signal ST is generated by the pulse oscillator OS1. The energization signals stored in the shift register R1 are transferred to the energization register R3 in synchronization with the timing signal $\phi 3$. Since the terminals 8, 9 of CPU remain at "0" in this state, the pulses 202*a* from the pulse oscillator OS1 are supplied as the strobe signals ST through the AND gate AND3 and OR gate OR1 to the AND gate AND4, thereby effecting the energization corresponding to the energization signals of the second column as shown in FIG. 11B. Said energization signals are supplied, after inversion by the inverter INV, to the correction register R2, and are also supplied, without said inversion, to a 3-input AND gate AND5, also receiving a constant signal "1" and the output signal of the correction register R2. The timing signals $\phi 3$, $\phi 4$ are prepared from the timing signal $\phi 2$ and are completely synchronized each other at a timing 505 shown in FIG. 11B. The signals supplied from the correction register R2 to the AND gate AND5 are immediately preceding energization signals after inversion, so that each bit which has not been energized is indicated by "1"-level signal. Thus the AND gate AND5 releases and stores, again in the shift register R1, correction signals containing a "1"-level signal in each bit which has not been energized before and is to be energized this time. In response to the succeeding timing signal $\phi 3$ at a timing 506 shown in FIGS. 11B and 11C, the correction signals stored in the correction register R2 are supplied to the energization register R3, whereby the heating elements which have been energized at the preceding timing do not receive corrective energizations, but the heating elements which have not been energized at the preceding timing but are energized this time receive corrective energizations by pulses 202*b* at a timing 506 shown in FIG. 11C. Consequently the heating elements of the thermal head receive, according to the print data of the second column constituting the character "A", energization pulses 202*a* and 202*b* as shown in FIG. 11C. Also the above-described control is applied to the pulses supplied to the heating elements of the thermal head according to the print data for the 3rd to 5th columns, as shown in FIG. 11C.

Figure 12:
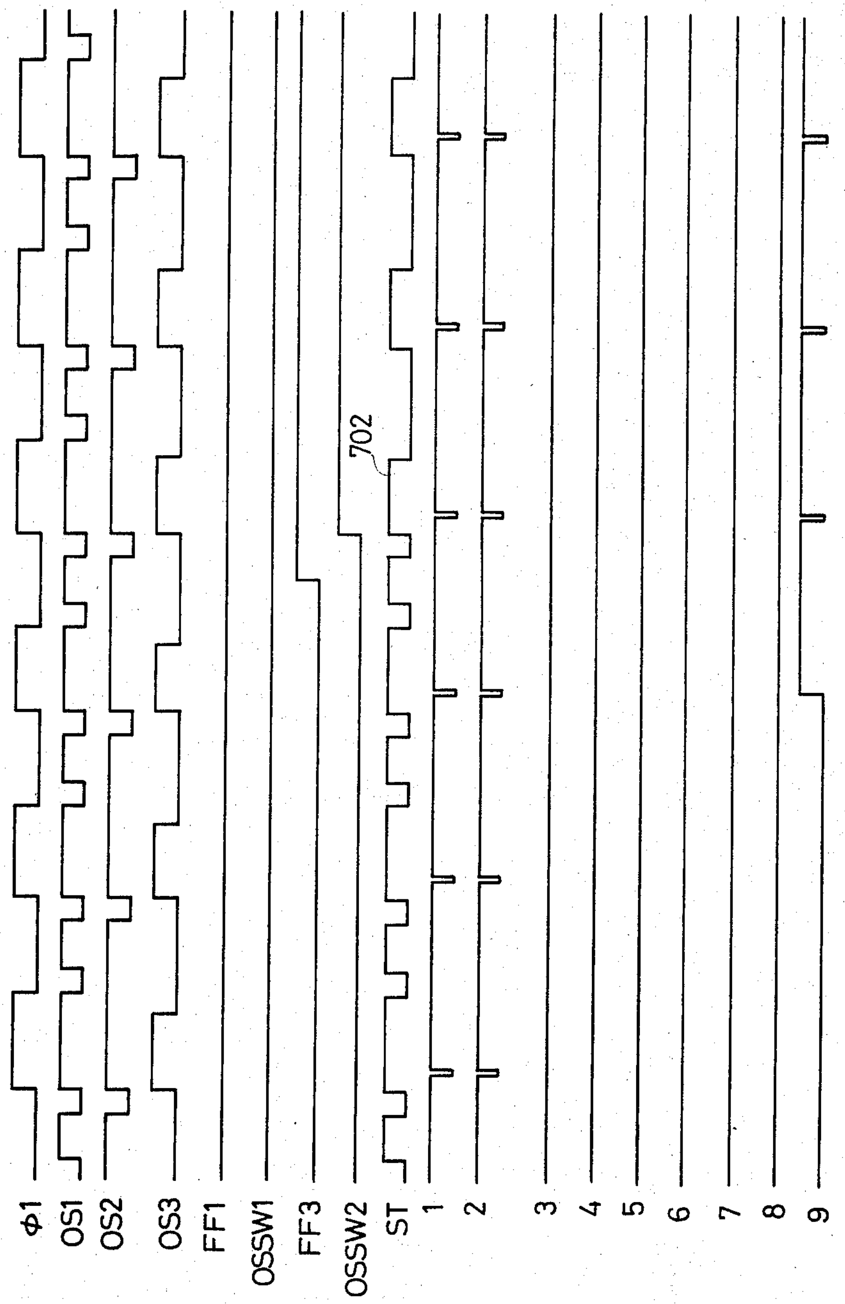

Also in case a same print pattern is repeated ten times as in the case of printing a form line or a graph, the terminal 9 of CPU releases a "1"-level output signal from the 11th time to open the AND gate AND6, whereby the consecutive pulses 702 generated by the pulse oscillator OS3 are supplied as the strobe signal ST to prevent the heat accumulation or overheating in the heating elements. FIG. 12 shows the data processing in such case.

As explained in the foregoing, the thermal printer of the present invention reduces the energizing time of each heating element in case it is continuously energized, and further reduces the energizing time in case a same print pattern, such as a form line or a graph, is repeated a determined number of times, thereby maintaining the heating elements of the thermal head at a constant temperature from the start to the end of printing operation, thus avoiding unevenness in print density and prolonging the service life of the thermal head.

What we claim is:

1. A thermal printer for printing an image on a printing sheet, comprising:
  - a thermal head having a plurality of heating elements;
  - pulse supply means for supplying print pulses to said thermal head such that said heating elements heat in accordance with information to be printed, wherein said pulse supply means is capable of executing a first pulse supply in which only a main pulse is supplied to said thermal head within a dot print timing, and a second pulse supply in which a main pulse and a subsidiary pulse shorter in width than said main pulse are supplied within the dot print timing while spaced in time from each other, and wherein said space between the main and the subsidiary pulses is provided for data processing; and
  - control means for controlling said pulse supply means in such a manner as to supply, as the first print pulse in a serial print operation, a print pulse longer in width than succeeding print pulses in said serial print operation, and wherein said control means control said pulse supply means in such a manner as to select one of said first pulse supply and said second pulse supply in accordance with data to be printed.

2. A thermal printer according to claim 1, wherein said serial print operation is a print scan of a line by said thermal head.

3. The thermal printer recited in claim 2, further comprising detecting means for detecting whether a given input data to be printed is the first input data for a given line, and supplying a signal, indicating the result of said detection, to said control means.

4. A thermal printer for printing an image on a printing sheet, comprising:

a thermal head having a plurality of heating elements;

pulse supply means for supplying print pulses to said thermal head such that said heating elements heat in accordance with image information to be printed; and control means for controlling said pulse supply means in such a manner as to supply, in the case that the same data is repeated in excess of a determined number of times, predetermined second print pulses during the supply of the same data in excess of the determined number of times, said second print pulses being shorter in width than first pulses supplied before said determined number of times.

5. A thermal printer according to claim 4, wherein said data is input from input means to a CPU.

6. A thermal printer according to claim 4, wherein said control means comprises a terminal which generates a signal when the same print pattern is repeated in excess of the determined number of times.

7. A thermal printer for printing an image on a printing sheet, comprising:

a thermal head having a plurality of heating elements;

pulse supply means capable of executing a first pulse supply in which only a main pulse is supplied to said thermal head within a dot print timing, and a second pulse supply in which a main pulse and a subsidiary pulse shorter in width than said main pulse are supplied within the dot print timing while spaced in time from each other, wherein said space between the main and the subsidiary pulses is provided for data processing; and control means for controlling said pulse supply means in such a manner as to select one of said first pulse supply and said second pulse supply in accordance with data to be printed.

8. A thermal printer according to claim 7, wherein said first pulse is supplied for the start of each line.

9. A thermal printer according to claim 7, wherein said data processing comprises data transfer to an energization register.

10. The thermal printer recited in claim 7, wherein said pulse supply means comprises a first pulse oscillator for supplying said first print pulses and a second pulse oscillator for supplying said second print pulses, and wherein each of said second print pulses is composed of plural print pulses of a duration shorter than that of said first print pulses.

* * * * *

UNITED STATES PATENT AND TRADEMARK OFFICE

CERTIFICATE OF CORRECTION

PATENT NO. : 4,636,810

DATED : January 13, 1987

INVENTOR(S) : OSAMUA SAKURA, ET AL.

It is certified that error appears in the above-identified patent and that said Letters Patent is hereby corrected as shown below:

Column 6

Line 21, "1" should read --0--.

Column 7

Line 49, "AND3" should read --AND2--.

Column 10

Line 21, delete "print";
Line 22, delete "print";
Line 23, delete "print";
Line 24, delete "print"; and
Line 25, delete "print".

Signed and Sealed this

Seventh Day of February, 1989

*Attest:*

DONALD J. QUIGG

*Attesting Officer*

*Commissioner of Patents and Trademarks*